(12) United States Patent
Cruttenden

(10) Patent No.: US 6,874,240 B1
(45) Date of Patent: Apr. 5, 2005

(54) ANGLE MEASURING AND LEVEL COMBINATION DEVICE

(76) Inventor: Roger D. Cruttenden, 619 Boston Rd., Mattydale, NY (US) 13211

(*) Notice: Subject to any disclaimer, the term of this patent is extended or adjusted under 35 U.S.C. 154(b) by 0 days.

(21) Appl. No.: 10/715,626

(22) Filed: Nov. 19, 2003

(51) Int. Cl.7 .................................................. G01C 9/12
(52) U.S. Cl. .......................................... 33/451; 33/391
(58) Field of Search .......................... 33/451, 391, 365; 116/225, 319, 321

(56) References Cited

U.S. PATENT DOCUMENTS

| | | | | |
|---|---|---|---|---|
| 667,836 | A | * | 2/1901 | Wood ........................... 33/354 |
| 892,468 | A | * | 7/1908 | Unger .......................... 33/391 |
| 1,038,705 | A | * | 9/1912 | Yantis .......................... 33/391 |
| 1,046,622 | A | * | 12/1912 | Maynard et al. ............... 33/391 |
| 1,257,256 | A | * | 2/1918 | LeBlond ....................... 33/391 |
| 1,297,914 | A | * | 3/1919 | Ruffin et al. .................. 33/391 |
| 1,481,716 | A | * | 1/1924 | Ketchum ...................... 33/391 |
| 1,590,136 | A | * | 6/1926 | Valentine, Sr. ................ 33/391 |
| 2,175,751 | A | * | 10/1939 | Tobe ........................... 33/354 |
| 4,188,729 | A | | 2/1980 | Peterson |
| 5,001,838 | A | | 3/1991 | Huxley et al. |
| 5,233,760 | A | | 8/1993 | Patterson |
| 5,438,761 | A | | 8/1995 | Krumszyn et al. |
| 5,640,774 | A | * | 6/1997 | Goldman .................... 33/1 SD |
| 6,032,376 | A | * | 3/2000 | Shurtleff ...................... 33/391 |
| 6,345,448 | B1 | | 2/2002 | Chontos |
| 6,363,622 | B1 | | 4/2002 | Stratton |
| 6,711,827 | B2 | * | 3/2004 | Dougherty ................... 33/370 |

* cited by examiner

Primary Examiner—Christopher W. Fulton

(57) ABSTRACT

An angle measuring and level combination device includes an elongated member having a first end, a second end, a top side, a bottom side, a first lateral side and a second lateral side. The elongated member has a length from the first end to the second end greater than three feet. An angle indicating assembly is mounted in a circular opening in the elongated member and is positioned generally between the first and second ends. The angle indicating assembly is viewable on each of the first and second lateral sides. Angle indicia are positioned on the first lateral side and extending around the opening. The angle indicia are zeroed along a line orientated perpendicular to the top and bottom sides.

5 Claims, 5 Drawing Sheets

ANGLE MEASURING AND LEVEL COMBINATION DEVICE

BACKGROUND OF THE INVENTION

1. Field of the Invention

The present invention relates to angle measuring devices and more particularly pertains to a new angle measuring device for providing the angle of incline of a surface.

2. Description of the Prior Art

The use of angle measuring devices is known in the prior art. While these devices fulfill their respective, particular objectives and requirements, the need remains for a device that provides the angle of surface as well as allowing a person to properly level an object. The need also remains for a device that indicates the inclination of an object while providing an elongated member for more precise measurement and an edge for the placement of guide markings on the object.

SUMMARY OF THE INVENTION

The present invention meets the needs presented above by comprising an elongated member having a first end, a second end, a top side, a bottom side, a first lateral side and a second lateral side. The elongated member has a length from the first end to the second end greater than three feet. An angle indicating assembly is mounted in a circular opening in the elongated member and is positioned generally between the first and second ends. The angle indicating assembly is viewable on each of the first and second lateral sides. Angle indicia are positioned on the first lateral side and extending around the opening. The angle indicia are zeroed along a line orientated perpendicular to the top and bottom sides.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
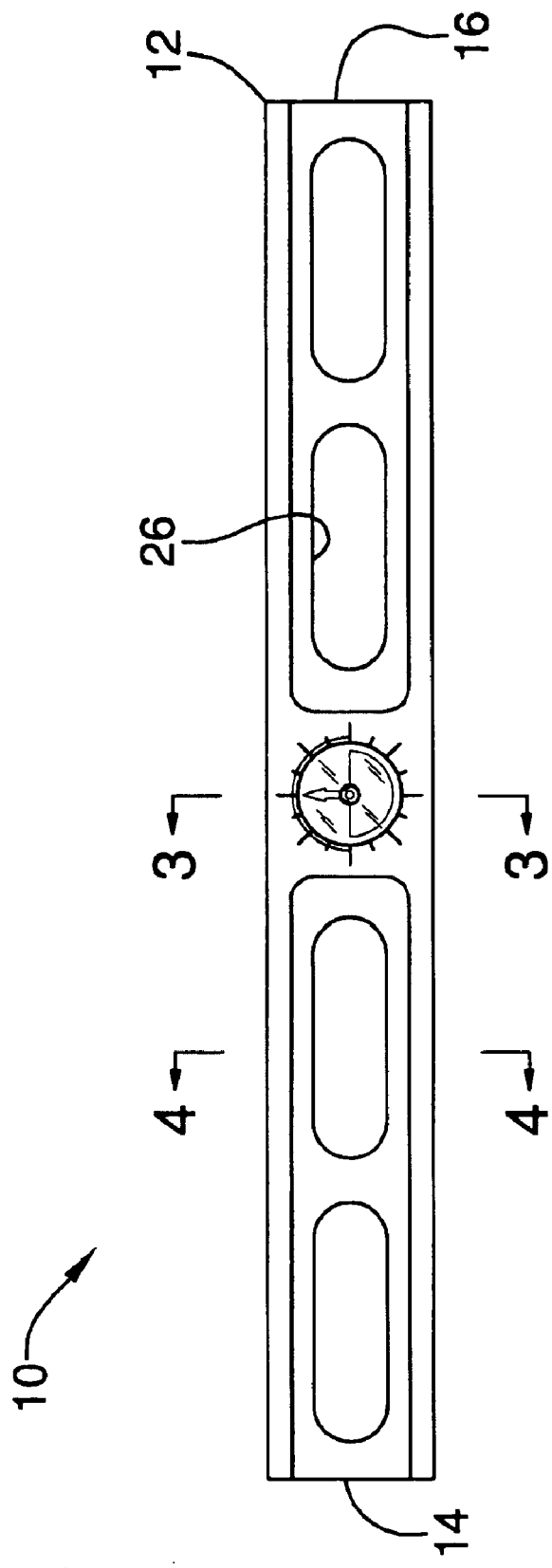
FIG. 1 is a schematic front view of an angle measuring and level combination device according to the present invention.
Figure 2:
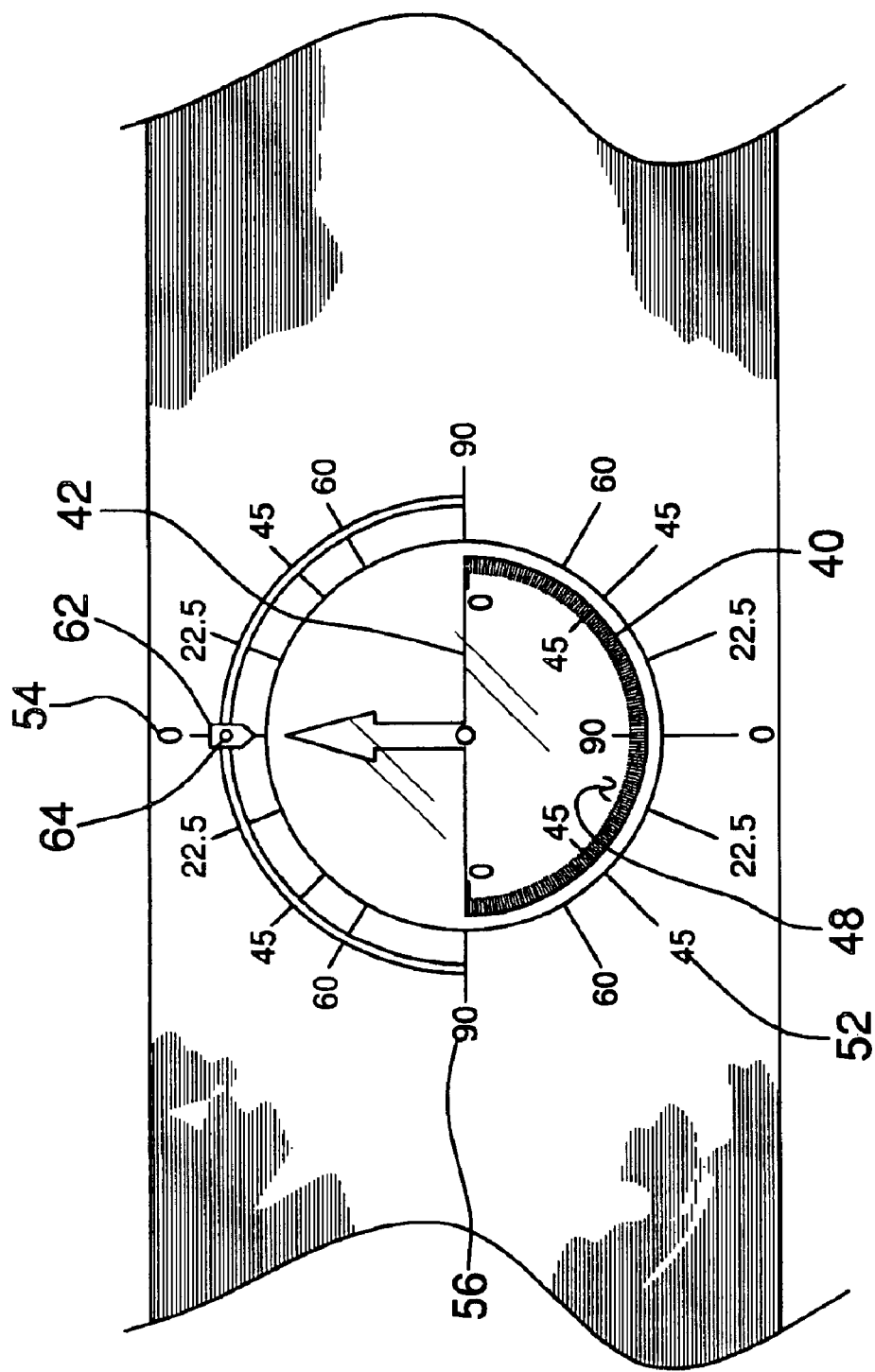
FIG. 2 is a schematic enlarged front view of the present invention.
Figure 3:
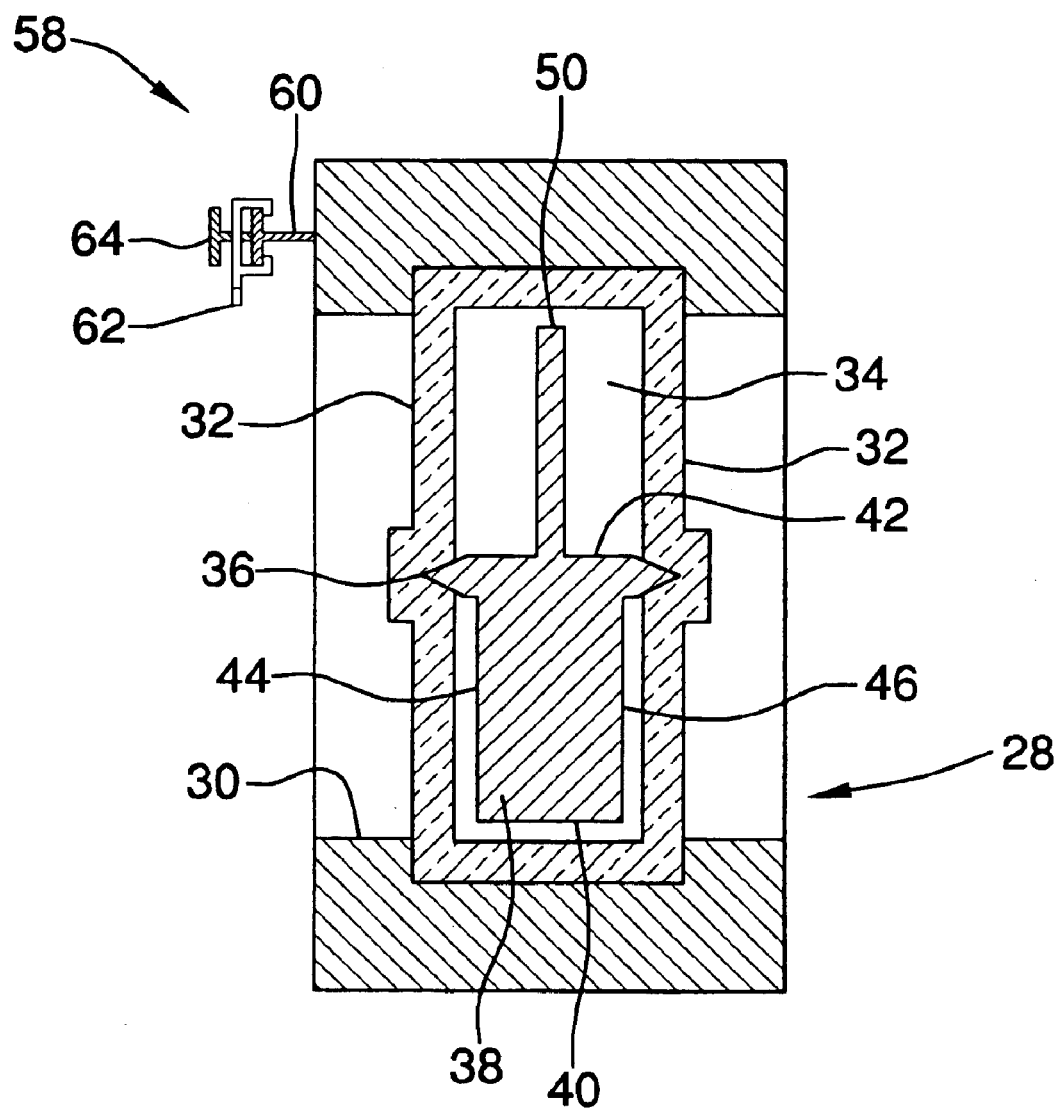
FIG. 3 is a schematic cross-sectional view taken along line 3—3 of FIG. 1 of the present invention.
Figure 4:
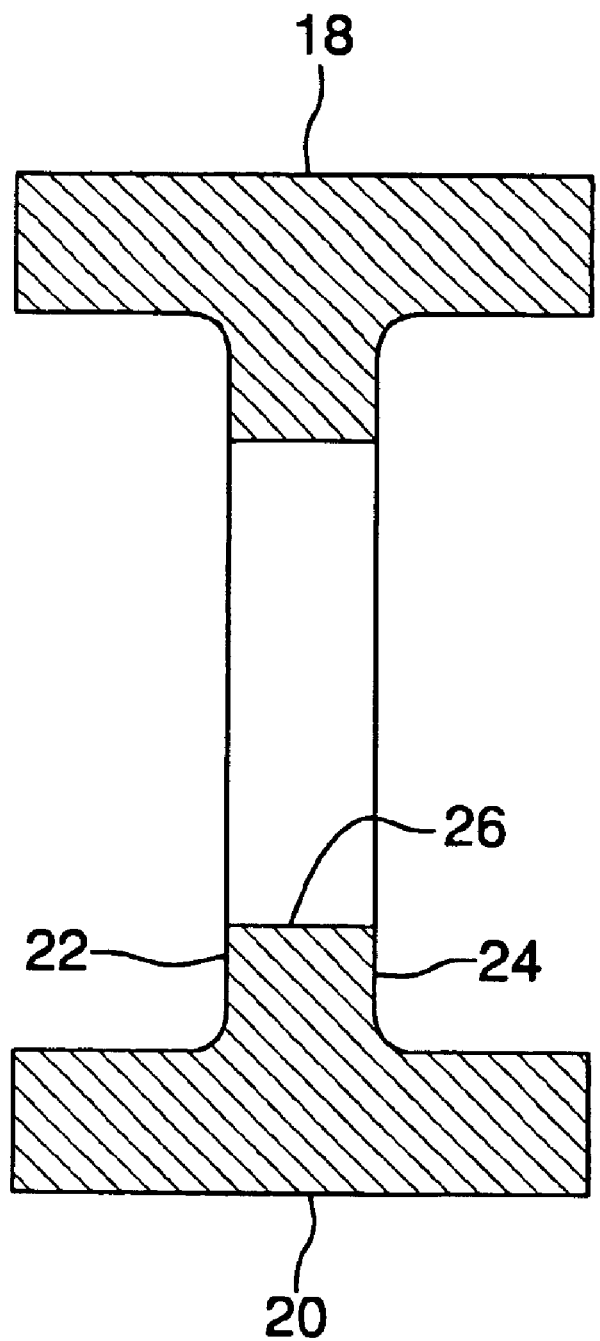
FIG. 4 is a schematic cross-sectional view taken along line 4—4 of FIG. 1 of the present invention.
Figure 5:
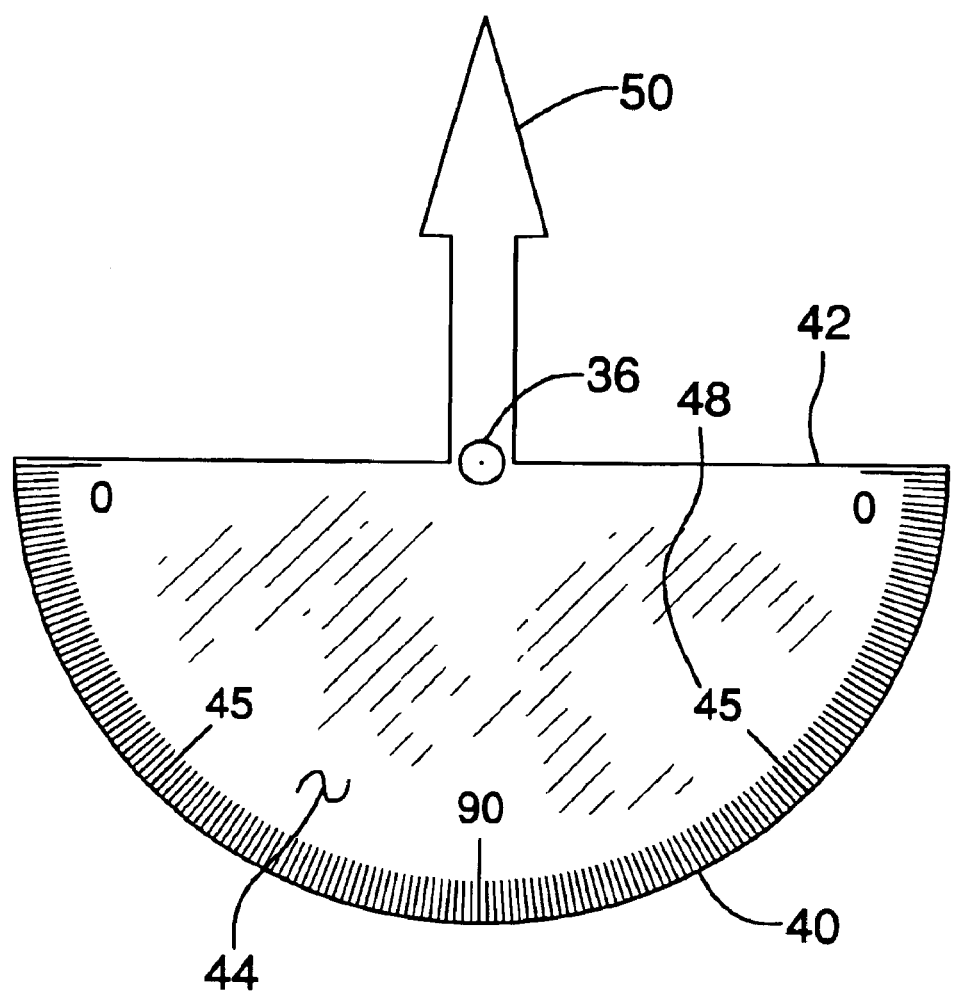
FIG. 5 is a schematic enlarged view of the semi-circular disc and pointer of the present invention.

With reference now to the drawings, and in particular to FIGS. 1 through 5 thereof, a new angle measuring device embodying the principles and concepts of the present invention and generally designated by the reference numeral 10 will be described.

As best illustrated in FIGS. 1 through 5, the angle measuring and level combination device 10 generally comprises an elongated member 12 having a first end 14, a second end 16, a top side 18, a bottom side 20, a first lateral side 22 and a second lateral side 24. The elongated member 12 has a length from the first end 14 to the second end 16 greater than three feet and ideally equal to at least four feet. The elongated member 12 has a plurality of apertures 26 extending through the first 22 and second 24 laterals sides to form handles and to lesson the weight of the elongated member 12.

An angle indicating assembly 28 is mounted in a circular opening 30 in the elongated member 12 and is positioned generally between the first 14 and second 16 ends. The angle indicating assembly 28 is viewable on each of the first 22 and second 24 lateral sides. The angle indicating assembly 28 includes a pair of transparent spaced walls 32 that are mounted in the opening 30 and are spaced from each other such that a compartment 34 is defined between the spaced walls 32. A spindle 36 extends between and is rotatably coupled to the spaced walls 32 such that the spindle 36 is positioned within the compartment 34. A semi-circular disc 38 has an arcuate edge 40 of 180 degrees and a straight edge 42. The disc 38 has a front surface 44 and a rear surface 46. The spindle 36 is attached to and substantially bisects the straight edge 42 such that the front 44 and rear 46 surfaces are substantially parallel with respect to the spaced walls 32. The front surface 44 has angle indicia 48 thereon extending along the arcuate edge 40. A pointer 50 is attached to and extends upwardly away from the spindle 36. It is preferred that the semi-circular disc 38, spindle 36 and pointer 50 are constructed of a continuous material. The pointer 50 is orientated perpendicular to the straight edge 42. The disc 38 has a greater weight than the pointer 50 such that the pointer 50 is continuously orientated perpendicular to the horizon.

Angle indicia 52 are positioned on the first lateral side 22 and extend around the opening 30. The angle indicia 52 are zeroed along a line orientated perpendicular to the top 18 and bottom 20 sides and preferably includes zero degree notations 54 at the top and bottom of the opening 30 and 90 degree notations 56 one either side of the opening 30.

An angle marker 58 is mounted on the first lateral side 22 and is positioned adjacent to the opening 30. The angle marker 58 includes a guide 60 extending along at least an upper half of the opening 30. A slide 62 is mounted on the guide 60 and is selectively positioned along a length of the guide 60. A coupler 64 is attached to the slide 62 for selectively securing the slide 62 to the guide 60 in a fixed position.

In use, the bottom side 20 of the elongated member 12 is placed upon a flat surface. The angle indicating assembly 28 indicates the angle at which the elongated member 12 is orientated. The angle marker 58 may be utilized for aiding when determining the correct positioning of the flat surface on which the elongated member 12 is positioned. The length of the elongated member 12 aids the user when drawing guide lines on the flat surface and to ensure correct positioning of the angle indicating assembly 28.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An angular measuring and leveling device comprising:
   an elongated member having a first end, a second end, a top side, a bottom side, a first lateral side and a second lateral side, said elongated member having a length from said first end to said second end greater than the three feet;
   an angle indicating assembly being mounted in a circular opening in said elongated member and being positioned generally between said first and second ends, said angle indicating assembly being viewable on each of said first and second lateral sides, said angle indicating assembly including;
      a pair of transparent spaced walls being mounted in said opening and being spaced from each other such than a compartment is defined between said spaced walls;
      a spindle extending between and being rotatably coupled to said spaced walls such that said spindle is positioned within said compartment;
      a semi-circular disc having an arcuate edge of 180 degrees and a straight edge, said disc having a front surface and a rear surface, said spindle being attached to and substantially bisecting said straight edge such that said front and rear surfaces are substantially parallel with respect to said spaced walls, angle indicia being positioned on said front surface and extending along said arcuate edge; and
      a pointer being attached to and extending upwardly away from said spindle, said pointer being orientated perpendicular to said straight edge, said disc having a greater weight than said pointer; and
   angle indicia being positioned on said first lateral side and extending around said opening, said angle indicia being zeroed along a line orientated perpendicular to said top and bottom sides.

2. The device of claim 1, further including an angle marker being mounted on said first lateral side and being positioned adjacent to said opening.

3. The device of claim 2, wherein said angle marker includes a guide extending along at least an upper half of said opening, a slide being mounted on said guide and being selectively positioned along a length of said guide.

4. The device of claim 3, further including a coupler being attached to said slide for selectively securing said slide to said guide in a fixed position.

5. An angular measuring and leveling device comprising:
   an elongated member having a first end, a second end, a top side, a bottom side, a first lateral side and a second lateral side, elongated member having a length from said first end to said second end greater than three feet;
   an angle indicating assembly being mounted in a circular opening in said elongated member and being positioned generally between said first and second ends, said angle indicating assembly being viewable on each of said first and second lateral sides, said angle indicating assembly including;
      a pair of transparent spaced walls being mounted in said opening and being spaced from each other such that a compartment is defined between said spaced walls;
      a spindle extending between and being rotatably coupled to said spaced walls such that said spindle is positioned within said compartment;
      a semi-circular disc having an arcuate edge of 180 degrees and a straight edge, said disc having a front surface and a rear surface, said spindle being attached to and substantially bisecting said straight edge such that said front and rear surfaces are substantially parallel with respect to said spaced walls, said front surface having angle indicia thereon extending along said arcuate edge;
      a pointer being attached to and extending upwardly away from said spindle, said pointer being orientated perpendicular to said straight edge, said disc having a greater weight than said pointer;
   angle indicia being positioned on said first lateral side and extending around said opening, said angle indicia being zeroed along a line orientated perpendicular to said top and bottom sides; and
   an angle marker being mounted on said first lateral side and being positioned adjacent to said opening, said angle marker including a guide extending along at least an upper half of said opening, a slide being mounted on said guide and being selectively positioned along a length of said guide, a coupler being attached to said slide for selectively securing said slide to said guide in a fixed position.

* * * * *